Nov. 21, 1950
C. CARSON
2,530,423
CALCULATING BOARD
Filed Feb. 27, 1946
2 Sheets-Sheet 1
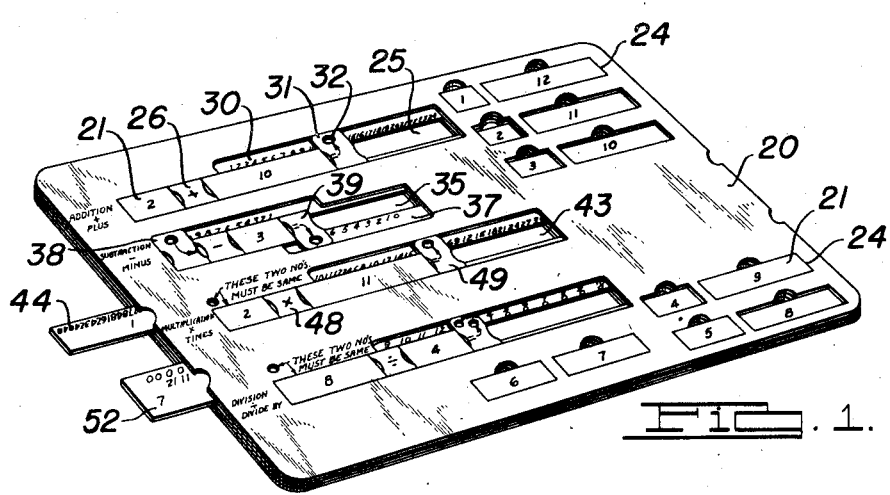
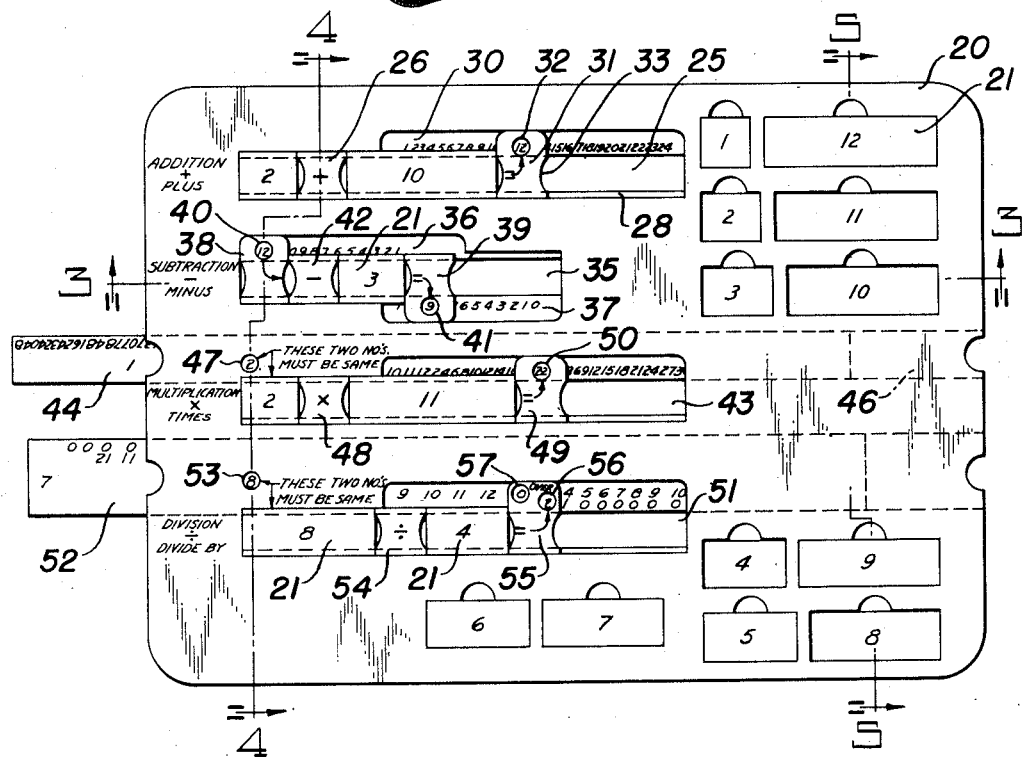
INVENTOR
Casimir Carson
BY
Louis Chayka
ATTORNEY Nov. 21, 1950  C. CARSON  2,530,423
CALCULATING BOARD
Filed Feb. 27, 1946  2 Sheets-Sheet 2
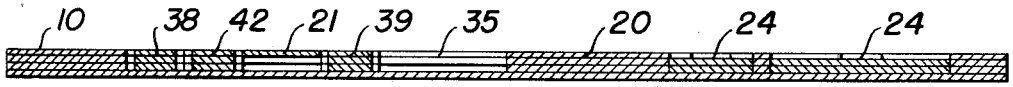
Fig. 3.
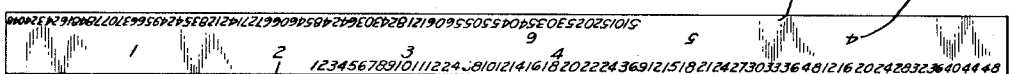
Fig. 4.
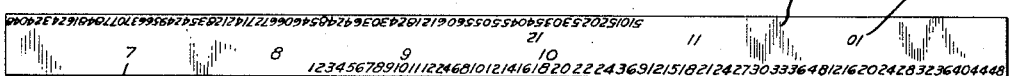
Fig. 5.
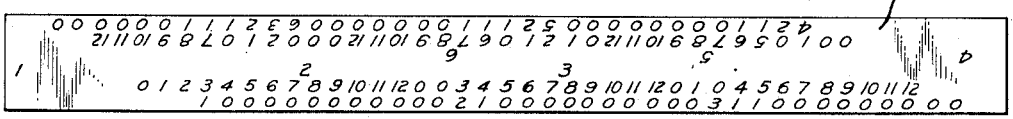
Fig. 6.
Fig. 7.
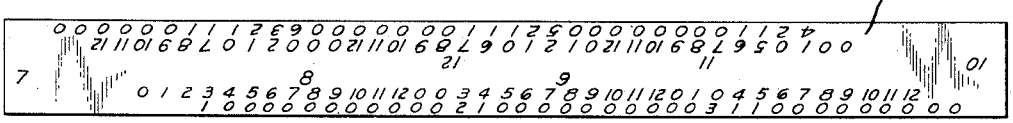
Fig. 8.
Fig. 9.
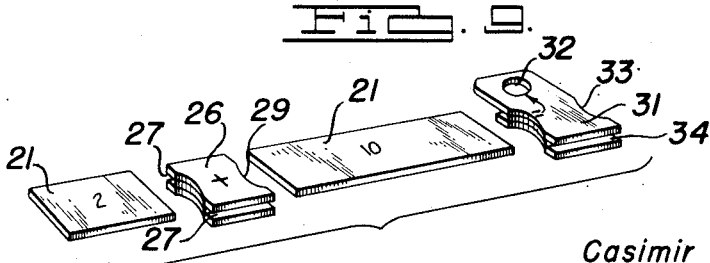
Fig. 10.
INVENTOR
Casimir Carson
BY Louis Chayka
ATTORNEY Patented Nov. 21, 1950

2,530,423

UNITED STATES PATENT OFFICE 2,530,423

CALCULATING BOARD

Casimir Carson, Dearborn, Mich.

Application February 27, 1946, Serial No. 650,606

5 Claims. (Cl. 35—31)

The purpose of my invention is to provide a game board both entertaining and instructive, by means of which simple arithmetical calculations, that is, such as additions, subtraction, multiplication and division, may be carried out easily and quickly.

Another purpose is to provide a game board to be used with separate indicators which vary in length in proportion to their numerical values. As a result of that, a calculation such as addition, is not an abstract mental process but is partly a visual process making the calculation more understandable.

I shall now describe my board with reference to the accompanying drawings, in which:

Fig. 1 is a perspective view of my board.

Fig. 2 is a plan view of my board with cooperative members partly drawn out and with some removable units placed in position therein.

Fig. 3 is an enlarged sectional view on line 3—3 of Fig. 2.

Fig. 4 is an enlarged sectional view on line 4—4 of Fig. 2.

Fig. 5 is an enlarged sectional view on line 5—5 of Fig. 2.

Fig. 6 is an enlarged plan view of a slide rule used in conjunction with my board.

Fig. 7 is a plan view of the reverse side of said slide rule.

Fig. 8 is a plan view of another slide rule used in conjunction with my board.

Fig. 9 is a plan view of the reverse side of the above slide rule.

Fig. 10 is an exploded view of movable elements employed in performing an arithmetical addition of figures.

Similar numerals refer to similar parts throughout the several views.

The board 20 is substantially rectangular in shape and may be made of plastic, fiber, or some other suitable material, and is used in conjunction with indicators 21 and sliding panels 22 and 23. The indicators are flat, rectangular pieces of cardboard, plastic, metal or other suitable material, and are of graduated length, varying according to the respective numeral which each of them is to represent. A number of indicators are marked 1 to represent one unit of value; other indicators are marked 2 to represent two units of value, others 3 and so on, up to and including numeral 12. Each set of indicators, identified by its number, is kept in a separate pocket 24, and all of them are herein referred to simply as indicators irrespective of their length or the numbers they bear, except that they may be referred to as indicator 1, to identify the indicator bearing numeral 1, or indicator 5 to indicate the indicator standing for numeral 5, and so on.

As above stated, the board is intended to be of aid in performing simple additions, subtractions, multiplications and divisions, each of which calculations must be carried on by means located within the respective part of the board. For that purpose, the board contains four separate calculating tracks, or elongated recesses disposed parallel to each other, as shown in the drawings. I shall start with the description of top track 25, including cooperative elements employed therein. Movably disposed within the track is a plus (+) sign on a slider 26, adapted to be shifted longitudinally within the track, but in a manner which does not permit its removal therefrom. The detail of construction which makes this possible is shown in Fig. 10. The slider, it will be noted, is grooved at 27 for engagement with a projecting strip tongue 28, best shown in Figs. 2 and 4, and has inwardly curved sides forming recesses 29 for their easier manipulation. Disposed parallel to the track 25 and at a level below the surface of the board is a sunken panel 30 with a row of figures inscribed thereon. The figures, including numerals 1 to 24, are spaced equally at a predetermined distance from each other. A block 31, also slidingly disposed within the track and provided with a window 32 through which a respective numeral on panel 30 may be seen, completes the material elements required for calculation to be performed in said track. It will be noted that the indicator is also provided with grooves 34, corresponding to grooves 27 and inwardly curving sides 33. At this point I wish to state that the counter representing unit 1, slider 26, and indicator 31 are each of the same length. This pertains also to other sliders and indicators used in conjunction with my board, and described hereinbelow. The row of numerals on panel 30, which carries consecutive numerals from 1 to 24, is located in such a manner that the window 32 of the indicator 31 will show numeral 2 when counter 1, slider 26, another counter 1, and the indicator are alined in an end to end abutment beginning from the left end of the first track from the top. The numerals on the panel 30 are spaced from each other at equal intervals. It is this spacing between any two numerals on said panel that is a measure of increased numerical value of the counters exceeding the length of counter 1. In other words, the length of counter 2, for instance, will be equal to the length of counter 1 plus the one space between any two numerals on panel 30. The length of counter 5 will be equal to the length of counter 1 plus four spacings, etc.

Since the steps to be carried out in top track 25 differ to some extent from those to be carried out in other tracks, I shall first describe the manner of calculations in said track 25. It will be assumed that the track contains no counters at all and that it is desired to add two numbers, say, 2 and 10. Such being the case, an indicator marked 2 is taken out of the respective pocket 24 containing indicators marked 2, and placed in track 25 at its left extremity. Thereupon, slider 26 with the plus (+) sign thereon, is moved into abutment therewith and indicator marked 10 is placed next to it so that slider 26 is between said indicators. The block 31 is next shifted against the free end of the indicator marked 10. The sum total of 2 and 10, that is, numeral 12, marked on panel 30 will be seen framed in window 32 for inspection.

I shall now refer to the following track 35 to be used for subtractions. The track, which is provided with two panels of figures, one 36 above the track, and one 37 below said track, employs two sliding blocks, one 38 to be used for the upper panel, and one 39 to be used for the lower panel of figures. The upper block is provided with a window 40, the lower with a window 41. Numeral 42 indicates a slider carrying a minus (—) sign.

In subtraction only one indicator is to be used. Assuming that numeral 3 is to be subtracted from numeral 12, block 38 will be shifted along the track till numeral 12 appears in window 40. Thereupon, slider 42 carrying the minus sign, is moved into abutment therewith; an indicator 21 bearing number 3 is taken out of its pocket 24 and set in track 35 between slider 42 and block 39. It will be understood that each of the above movable members, blocks, the slider and the indicators, are in an end-to-end abutment with the adjoining members. Window 41 will then frame the numeral showing the difference between numerals 12 and 3, that is, numeral 9, as shown in Fig. 2.

In arriving at the result of multiplications of figures, which calculations are to be carried out in the third track from the top, namely, track 43, again indicators for both numerals to be multiplied have to be employed. Here, however, a sliding panel 44 shown in Figs. 6 and 7, is to be used, the rule having four rows of figures on each surface, that is, on the front surface and the back surface. The figures, adjacent each edge of the panel, set out numerals to be derived out of multiplication. The row of figures above that, with considerable spacing therebetween, shows numerals of the multiplicands. These are marked 45. The sliding panel fits into a slot 46 in the body of the board, the slide being disposed under the top surface of said board parallel to track 43. The board is provided with a window 47, just above said track 43, in line with and above the path of the sliding panel 44. A slider 48 carrying a multiplication (×) sign is disposed within the track and so is block 49, having a window 50. In order to obtain multiplication results of two numbers, say, 2 and 11, an indicator for each number has to be set within the track, like in addition, with the slider 48 between them. Then, the block 49 is shifted against the last indicator, in this case against the counter representing multiplier 11. However, to secure results, the sliding panel must be moved in or out, as the case may be, so that the multiplicand, which in this case is 2, must also be seen through said window 47. The result 22 will appear in window 50 of block 49.

I shall finally describe the last track 51. Here, also, sliding panel 52 has to be used in conjunction with removable indicators 21. However, the sliding panel has three parallel rows of figures along each edge, as shown in Figs. 8 and 9. The board has a window 53, while the track contains a slider 54 with a division (÷) sign thereon, and an indicator 55 provided with two windows 56 and 57, the latter being at a higher level than said window 56. Here again the number to be divided, that is, the dividend, say, number 8, represented by its indicator, and the divisor, say, 4, also represented by an indicator, are set in the track in the order set forth but with a slider 54 disposed between them. The block is shifted against the side of the divisor, while the slidable panel 52 is moved within its slot till the window 53 will show the number to be divided, that is number 8. The quotient will be found in the lower window 56 of block 55. The upper window 57 will show the remainder.

I wish to point out that the spacing of the figures on the fixed panels, used in additions and subtractions, and on the sliding panels, used in multiplications and divisions, is made with reference to the length of the indicators used in all calculations, and that said spacing is equal to the difference in length between any two indicators representing consecutive figures.

As already indicated in substance the movable members within each track, such as blocks, spacing sliders and the interchangeable counters have to be linearly alined in end to end abutment beginning from the initial point of the respective track, which in this case is the left end of each track.

The scope of the board is limited in this respect that only numerals up to 12 may be employed in calculations to be performed by means of said board. Obviously, other boards may be made along the same lines capable of accommodating larger numbers. It will be also seen that some changes may be made in the construction of the board, the shape of the counters, blocks and tracks, without departing from the inventive principle disclosed herein. What I, therefore, wish to claim is as follows:

1. A device for solving mathematical problems comprising a board formed with a longitudinally extending recess having a laterally extending offset portion for a part of its length, there being numbers displayed in the offset portion and arranged in a line and progressively increasing in value from one end of the offset portion toward the other end thereof, a slider in said recess shiftable longitudinally thereof to adjusted positions and bearing a character indicating the type of problem to be solved, a block slidable longitudinally in said recess and having a portion extending into the offset portion and formed with an opening through which the numbers are successively displayed when the block is moved along the recess to adjusted positions, and a series of indicators bearing value markings and being of progressively increasing length and value from one end of the series of indicators to the other end thereof, the indicators being selectively fitted into the recess in abutting relation to the slider and the block and together therewith having a combined length serving to dispose the block in an adjusted position in which the number displayed through the opening constitutes the answer to the problem.

2. A device for solving mathematical problems in addition comprising a board formed with a longitudinally extending recess having a laterally extending offset portion along one side which extends longitudinally of the recess from the inner end thereof, there being a line of numbers displayed through the offset portion and arranged in evenly spaced relation to each other and being of progressively increasing values, a slider shiftable longitudinally in said recess and bearing a plus marking, a block slidable longitudinally in said recess and having a portion extending into the offset portion and being formed with an opening through which the numbers are successively displayed when the block is slid along the recess, and a series of indicators bearing value markings and progressively increasing in length and value from one end of the series of the indicators to the other end thereof, selected ones of said indicators being fitted into said recess at opposite sides of the slider and together therewith having a combined length serving to dispose the block in such position that the number displayed through the opening in the block constitutes the sum of the added value markings upon the indicators and also constitutes the answer to the problem.

3. A device for solving mathematical problems in subtraction comprising a board formed with a longitudinally extending recess having offset portions at opposite sides, said offset portions being at opposite sides of the recess with one extending from the outer end of the recess and the other from the other end of the recess, there being a series of evenly spaced numbers displayed in each offset portion and arranged in a line and progressively increasing in value from one end of the line toward the other end thereof, a block slidable longitudinally in said recess and having a portion extending into one offset portion and formed with an opening through which a selected number in said offset portion is displayed, a slider in said recess next to said block having a minus mark, a second block slidable longitudinally in said recess and having a portion extending into the second offset portion and being formed with an opening through which a number in the second offset portion is displayed, and a series of indicators bearing value markings and progressively increasing in length and value from one end of the series of indicators to the other end thereof, a selected one of said indicators being fitted into said recess between the slider and the second block, the combined length of the blocks and the slider and the selected indicator being such that the number appearing through the openings of the second block constitutes the answer to the problem.

4. A device for solving mathematical problems in multiplication comprising a board formed with a longitudinally extending recess having an outer end spaced from one end of the board and widened for a portion of its length to form an offset portion extending longitudinally of the recess and having one end spaced inwardly from the outer end of the recess, said board being formed with a longitudinally extending pocket leading from the end of the board and for a portion of its length communicating with the offset portion of the recess, the board being also formed with an opening offset laterally from the recess, a panel slidable longitudinally in said pocket and provided along one side edge portion with a series of evenly spaced numbers exposed through the offset portion and progressively increasing in value toward the inner end of the recess, a slider in said recess slidable longitudinally therein between the outer end of the recess and the offset portion thereof and being marked to indicate multiplication, a block slidable longitudinally in the recess and its offset portion and within the offset portion being formed with a window through the numbers on the panel are successively displayed by movement of the block longitudinally in the recess, the panel bearing another series of numbers progressively increasing in value and successively exposed through the opening when the panel is slid longitudinally, and a set of indicators of a width adapting them to be removably fitted into the recess at opposite sides of the slider, said indicators progressively increasing in length from the first indicator to the last one and bearing identifying numbers of progressively increasing values, each indicator of the set being longer than the adjoining indicator, a distance corresponding to the space between the numbers on the panel, whereby the combined length of the selected indicators and the slide and the block when assembled in the recess will dispose the block in position locating its window over a number upon the panel constituting the answer to the problem.

5. A device for solving mathematical problems in division comprising a board formed with a longitudinally extending recess widened for a portion of its length and forming a laterally extending offset portion, spaced from the outer end of the recess, the board being also formed with an opening spaced laterally from the outer end of the recess at the side thereof from which the offset portion extends, there being a pocket extending longitudinally of the board and open at one end and for a portion of its length communicating with the offset portion of the recess, a panel slidable longitudinally in the pocket and bearing along a side edge portion a series of evenly spaced numbers progressively increasing in value and for a portion of the length of the panel exposed through the offset portion of the recess, the panel also having another series of evenly spaced numbers progressively increasing in value and for a portion of the length of the panel exposed through the offset portion over the first series of numbers, there being above the second series a plurality of numbers spaced from each other longitudinally of the panel and successively exposed through the opening when the panel is slid longitudinally to adjusted positions, a slider shiftable longitudinally in said recess and marked to indicate division, a set of indicators having progressively increasing lengths and value markings, selected indicators being fitted into said recess at opposite sides of said slider, the first indicator being provided with a value marking corresponding to the number displayed through the opening in the board and the other indicator having a value marking by which the value marking of the first indicator is to be divided, and a block slidable longitudinally in the recess and disposed in abutting engagement with the second indicator and having a portion extending across the offset portion and formed with openings through which are disclosed predetermined numbers of the first and second series of numbers constituting the answer to the problem.

CASIMIR CARSON.

REFERENCES CITED

The following references are of record in the file of this patent:

UNITED STATES PATENTS

| Number | Name | Date |
|---|---|---|
| 2,317,206 | Major | Apr. 20, 1943 |

FOREIGN PATENTS

| Number | Country | Date |
|---|---|---|
| 555,921 | Great Britain | Sept. 13, 1943 |